Patented Aug. 9, 1949

2,478,182

UNITED STATES PATENT OFFICE 2,478,182

SODIUM CHLORIDE TABLET

William V. Consolazio, United States Navy

No Drawing. Application January 16, 1945,
Serial No. 573,094

1 Claim. (Cl. 167—82)

(Granted under the act of March 3, 1883, as
amended April 30, 1928; 370 O. G. 757)

This invention relates to ingestible materials in tablet form and a method of treating such materials to retard their rate of absorption in the gastro-intestinal tract. More particularly, it relates to tablets, such as salt tablets, the granules of which are coated with membranous films to retard absorption and methods of preparing such tablets.

Salt tablets have been used for some time to combat the ill effects of heat and excessive sweating, but epigastric discomfort, nausea, and vomiting often follow their ingestion. In some steel mills the frequency and severity of these symptoms were so disturbing that operators resorted to salted drinking water (0.10–0.15%) rather than issue salt tablets. The frequency of gastric symptoms is reduced by salted drinking water, but the procedure of salting the water has proved to be difficult to apply in practice as compared with the dispensing of salt tablets. Furthermore, most persons object to the drinking of salted water.

Previous attempts have been made to reduce the ill effects of salt tablets by developing a tablet which would disrupt and go into solution almost immediately, on the theory that the symptoms were due to irritation of the gastric mucosa by prolonged contact. One such tablet, containing one percent cornstarch as a disrupting agent, causes considerable gastric distress.

The object of this invention is to retard the rate of absorption of salt tablets, or other active materials in tablet form, in order to lessen gastric discomfort and nausea associated with present tablets.

I have found that prolonging the solution time of common salt tablets results in elimination of discomfort in many cases. According to my invention, the time of solution of tablets is prolonged by impregnating the tablets or coating the active ingredient thereof with water-insoluble, non-toxic, permeable, membranous films which are readily eliminated from the system by excretion in the feces. Other tablets such as atabrine tablets, potassium iodide tablets, and the like, may also be impregnated or coated similarly in order to impart slow availability or to alleviate or eliminate the gastro-intestinal upset sometimes associated with the ingestion of such tablets.

The impregnating or coating agents which have been found to be most effective are cellulose derivatives, and, in particular, cellulose acetate and cellulose nitrate. The best results were obtained from low viscosity, high acetyl, cellulose acetate. Cellulose nitrate sold under the name of collodion cotton or pyroxylin may be used effectively. Pyroxylin is defined as the product obtained by the action of a mixture of nitric and sulfuric acids on cotton and consists chiefly of cellulose tetranitrate $(C_{12}H_{16}O_6(NO_3)_4)$. For impregnating or coating tablets, these cellulose derivatives are dissolved in a suitable solvent which may be readily removed by evaporation, with or without heating.

In preparing the tablets, the size of the granules of the material to be formed into tablets, the pressure to be applied in forming the tablets, and the concentration and proportion of the impregnating or coating material, are varied and controlled in order to retard the solution time of the tablets to the desired extent. In the case of salt tablets, the solution time should be about 60 to 80 minutes for a ten grain tablet. The size of the granules to be tableted affects the solution time; in general, the larger the granule, the shorter the solution time. The pressure employed in forming the tablets is important, and excessive pressure may decrease the interstices between granules and prevent adequate impregnation of the tablet.

I prefer to prepare the tablets by first forming the tablets in the usual tableting machine from finely divided material under a pressure of several tons per square inch, and not exceeding ten tons per square inch, then dipping the tablets for a short time in a dilute solution of the impregnating or coating material, with or without heat or vacuum, and then drying to remove the solvent. Other methods may be used, such as applying the impregnating or coating material to the granules or crystals before tableting.

In order to describe the method of preparing the tablets more fully, the following example is given, but it is to be understood that the invention is not limited thereto.

Using common salt with granules of such size as to pass through a No. 40 U. S. Standard sieve, tablets were prepared at 5½ tons per square inch in the size and weight now being issued for salt dispensing machines (diameter $\frac{13}{32}$ inch, weight 0.65 gram). The tablets were dipped twice for approximately ten seconds in a 2.5 per cent solution of cellulose nitrate made up in a solvent consisting of 3 parts of ether and 1 part of ethyl alcohol. The tablets were finally dried at 100° C. for 5 minutes to remove the last trace of solvent. The total weight of the impregnating film was approximately 4 mg. Cellulose acetate may be substituted for the cellulose nitrate in the foregoing example, using a 4–5 per cent solution of a low viscosity, high acetyl cellulose acetate in acetone as the solvent.

The cellulose acetate or nitrate penetrates the tablet forming a honeycomb structure around the salt granules. The granules are contained in small cellular compartments so that, in dissolution, fluid dialyzes into the cellular compartments, and salt or other enclosed material dialyzes out into the surrounding fluid, resulting in slow availability of the substance desired.

Also, when the cellular compartments become engorged with fluid, these sacs burst and liberate the desired substance. With respect to the salt tablet, this mechanism results in a solution time of about 60 to 80 minutes for a ten grain tablet. When the tablet is completely dissolved, the cellular stroma of the impregnating film remains and is eliminated from the system in this form.

The impregnating film does not impair the structural permanency of the tablet but, in fact, strengthens it, by virtue of its cellular structure throughout. Such minor friction as occurs in packaging and shipping does not affect the solution time of the tablet. The tablets have been stored in open containers at 50° C. in an atmosphere of saturated water vapor without noticeable change in their properties. Field tests of the tablets under tropical weather conditions have proved that they remain intact while commercial tablets now on the market frequently disintegrated.

Extensive tests have been carried out which prove that cellulose nitrate and cellulose acetate are non-toxic, and the cellulosic stroma of the impregnated tablet passes harmlessly through the gastro-intestinal tract.

The invention described herein may be manufactured and used by or for the Government of the United States of America for governmental purposes without the payment of any royalties thereon or therefor.

I claim:

An internally reinforced sodium chloride tablet comprising compressed granules of sodium chloride; and an internally disposed cellular stroma of a thin, permeable, dialyzing film of a material selected from the group consisting of cellulose acetate and cellulose nitrate, the cells of said stroma containing said granules of sodium chloride, whereby the sodium chloride is rendered slowly available when the tablet reaches the gastro-intestinal tract, the solution time of the sodium chloride in said tablet in the gastro-intestinal fluids being from 60 to 80 minutes for a ten grain tablet.

WILLIAM V. CONSOLAZIO.

REFERENCES CITED

The following references are of record in the file of this patent:

UNITED STATES PATENTS

| Number | Name | Date |
| --- | --- | --- |
| 975,405 | Eilertsen | Nov. 15, 1910 |
| 1,021,674 | Horowitz | Mar. 26, 1912 |
| 2,011,587 | Miller | Aug. 20, 1935 |
| 2,196,768 | Hiatt | Apr. 9, 1940 |
| 2,373,763 | Kuever et al. | Apr. 17, 1945 |
| 2,410,417 | Andersen | Nov. 5, 1946 |

FOREIGN PATENTS

| Number | Country | Date |
| --- | --- | --- |
| 302,334 | Germany | Dec. 11, 1917 |